(No Model.)
H. T. DAVIS.
DEVICE FOR TIGHTENING JOINTS OF FURNITURE.
No. 526,615. Patented Sept. 25, 1894.
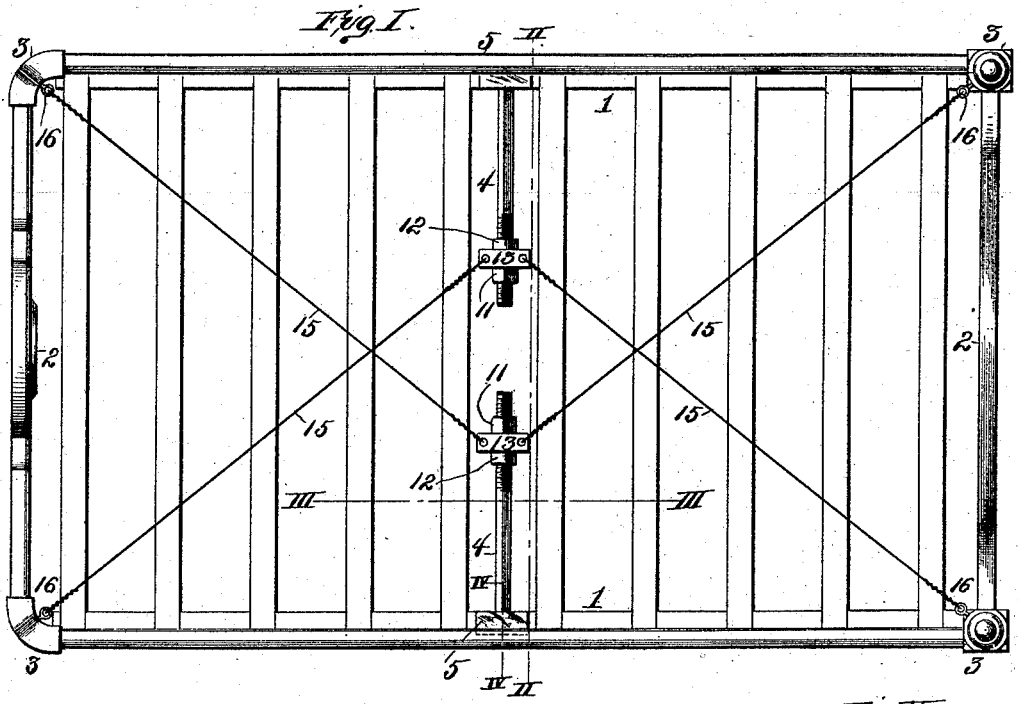
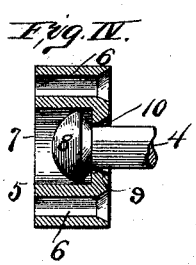
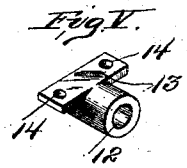
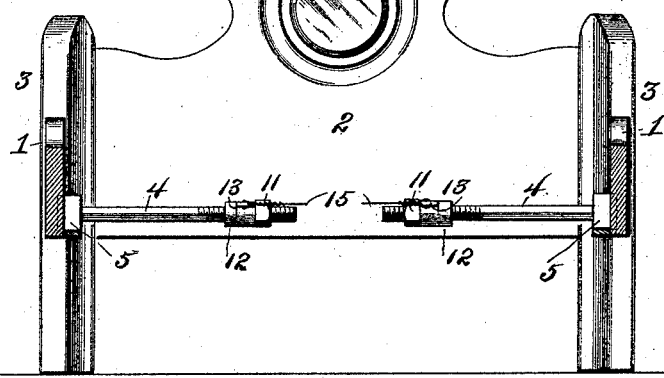
Attest
A. W. Ebersole
G. E. Ebersole
Inventor:
Henry T. Davis.
By Knight Bros.
Attys

UNITED STATES PATENT OFFICE.

HENRY T. DAVIS, OF CHICAGO, ILLINOIS.

DEVICE FOR TIGHTENING JOINTS OF FURNITURE.

SPECIFICATION forming part of Letters Patent No. 526,615, dated September 25, 1894.

Application filed January 29, 1894. Serial No. 498,308. (No model.)

*To all whom it may concern:*

Be it known that I, HENRY T. DAVIS, of the city of Chicago, county of Cook, and State of Illinois, have invented a certain new and useful Improvement in Devices for Tightening the Joints of Furniture, of which the following is a full, clear, and exact description, reference being had to the accompanying drawings, forming part of this specification.

My improvement relates to a device which is specially adapted for tightening the joints of all kinds of furniture, and which may at a small cost, and with slight variations, be applied to any number of forms of furniture. I have shown the invention applied to a bedstead.

My invention consists in features of novelty hereinafter fully described and pointed out in the claim.

Figure I is a top or plan view of a bedstead with my improvement applied. Fig. II is a transverse section taken on line II—II, Fig. I. Fig. III is a detail longitudinal section taken on line III—III, Fig. I. Fig. IV is an enlarged detail section taken on line IV—IV, Fig. I. Fig. V is a perspective view of one of the sleeves.

Referring to the drawings:—1 represents the sides, 2 the ends, and 3 the corner posts of a bedstead.

4 represents two rods connected respectively to the sides of the bedstead by means of brackets 5, having screw bolts 6, and each having a socket 7 to receive the conical head 8 of the bolt 4. The opening 9 into which the bolt fits is flared outwardly, as shown at 10, so as to permit the bolt to move slightly in either direction. The inner end of each bolt is threaded so as to receive a nut 11.

Surrounding the bolts and fitting against the nuts 11 are tubes or sleeves 12, which fit loosely on the bolts. Each of these sleeves has a cross bar 13 perforated at 14 for an attachment of wires or cables 15, the outer ends of which are connected to the corner posts of the bedstead, preferably by means of eye bolts 16.

When the joints of the bed become loose they are tightened by screwing up on the nuts 11, which causes the sleeves 12 to be forced inwardly on the bolts 4, and by virtue of the ball and socket joint between the bolts and the brackets 5 the inner ends of the bolts may swing slightly in either direction so that the tension on each one of each pair of wires will be substantially uniform.

The device is very cheap and effective and can be easily applied to any bed or other piece of furniture in use, or to a new article.

I claim as my invention—

In a device for tightening the joints of furniture, a combination of bolts 4, having conical heads cables 15, means for adjustably connecting the cables to the ends of said bolts, and brackets for securing the bolts to the furniture, said brackets having sockets to receive the conical heads of the bolts, and having taper openings 9, substantially as and for the purpose set forth.

HENRY T. DAVIS.

In presence of—
S. P. LANGWORTHY,
S. F. ASHLEY.